(No Model.)
L. E. A. PRANGEY.
APPARATUS FOR SEPARATING LIQUIDS AT DIFFERENT BOILING POINTS.
No. 407,114. Patented July 16, 1889.
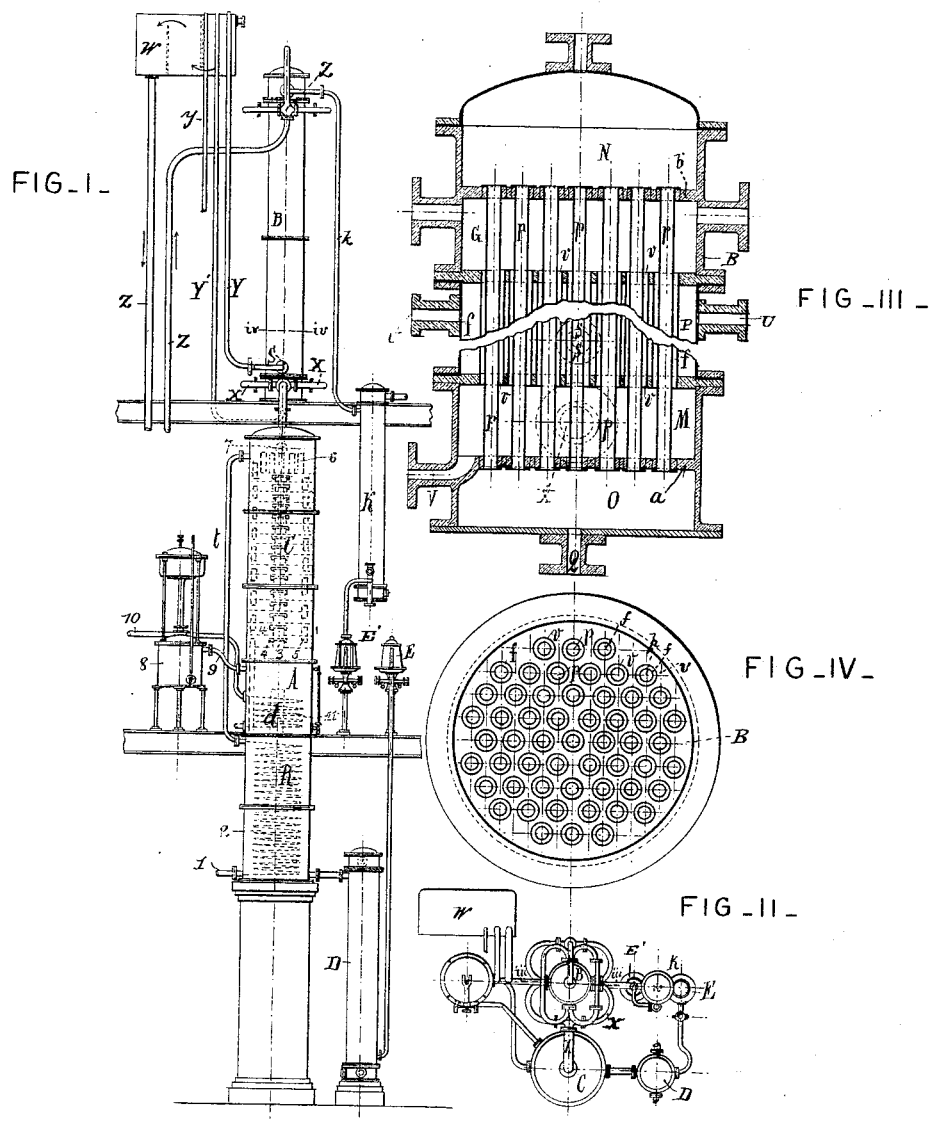
Witnesses,
C. J. Hedrick
H. D Dorsey
Inventor,
Louis Esme Achille Prangey
by A. Holok
his attorney

UNITED STATES PATENT OFFICE.

LOUIS EDME ACHILLE PRANGEY, OF PARIS, FRANCE.

APPARATUS FOR SEPARATING LIQUIDS AT DIFFERENT BOILING-POINTS.

SPECIFICATION forming part of Letters Patent No. 407,114, dated July 16, 1889.

Application filed August 24, 1888. Serial No. 283,654. (No model.)

*To all whom it may concern:*

Be it known that I, LOUIS EDME ACHILLE PRANGEY, a citizen of the Republic of France, and a resident of Paris, in said Republic, have invented certain new and useful Improvements in Apparatus for Separating Liquids at Different Boiling-Points, of which the following specification is a full, clear, and exact description.

This invention relates to apparatus for separating liquids whose boiling-points are different in general and for purifying crude alcoholic spirits from aldehydes and other light products in particular.

The new or improved apparatus is composed of two principal parts—namely, first, a heater or boiler in which the mixture of liquids to be separated is placed, and which is suitably arranged for heating the mixture, so as to vaporize the liquids or a suitable portion thereof; second, a condenser with surfaces arranged in such manner that the vapors produced in the heater or boiler cannot traverse such condenser without each particle thereof being brought into contact with the said surfaces, which are maintained at such temperature that the vapors of the liquids to be eliminated cannot condense, while the vapors of the liquids to be retained are caused to condense thereon thoroughly.

Certain particular dispositions enable the operation to be made continuous, and by providing for the recovery of the heat render it extremely economical.

The new or improved apparatus is capable of application in all cases where the separation is to be effected of liquids possessing different boiling-points.

The accompanying drawings represent, by way of example, an apparatus constructed in accordance with the invention and adapted to the treatment of crude alcoholic spirits or phlegms for the separation of ethylic alcohol from aldehydes and other more volatile products which crude alcohols contain; but whatever may be the class and nature of the liquids to be separated the principles embodied in the apparatus remain the same.

Figure I is an elevation, and Fig. II a plan, of the alcohol apparatus; and Figs. III and IV are respectively a vertical section on line *iii* of Fig. I and a cross horizontal section on line *iv* of Fig. I of the analyzing-condenser.

As before indicated, the apparatus consists, essentially, of a vaporizing heater or boiler A and a condenser B, which analyzes the vapors produced with certain dispositions which assure the continuity and economy of the operation.

The phlegms or crude spirits before their introduction into the boiler A pass by the pipe 1 into a coil 2 (indicated in dotted lines) in the regenerator R, and after traversing said coil are delivered by the pipe *t* into the top of the column C. In their passage through the coil they are heated by the purified phlegms (from which the lighter products have been removed) which pass through said regenerator R from the boiler A, which purified phlegms are themselves cooled in raising the temperature of the fresh phlegms or crude spirits.

The column C, which may be called a "retarding-analyzer" from its action in holding back the liquids and analyzing them by successive partial vaporizations, is divided by numerous plates or divisions. (Indicated in dotted lines.) As shown they are the form common in certain distilling and rectifying columns, in which necks 3, for the passage of the ascending vapors, are covered by inverted caps 4, and the liquid is conveyed from plate to plate by overflow-pipes 5, so that the rising vapors are caused by inverted cups 4 to bubble through the liquid on the plates and impart their heat to the same. The pipe *t* delivers the phlegms raised in temperature by the heat extracted from the purified phlegms in the vessel R onto the top plate of the column, and the said phlegms then descend from one plate to the next below successively until they enter the boiler A. In their descent they are heated to ebullition at each plate which they encounter, so that they arrive in the boiler A after having given off vapors during a time which is a function of the size of the column C and the supply of liquid. It is hardly necessary to say that, other things being equal, the supply should be less if the phlegms are strong in aldehydes and other foreign bodies of low boiling-point, and may be larger if the proportion of these impurities is less.

Various means of heating may be used to induce the partial evaporation of the phlegms during their stay on each plate or in each chamber of the column. Thus, for example, the plates may be provided with false bottoms and heated by water, steam, or other vehicle, or they may be provided with round or flattened coils in place of the false bottoms, and so other ordinary or suitable arrangements may be adopted.

The passage of the phlegms from plate to plate can be effected in various ways, such as passage through overflow-pipes whose lower ends dip below the liquid on the plate below, or the passage as a sheet occupying the whole or a part of the throat for the vapors, and so on.

In order to prevent the accidental introduction of cold phlegms on the top plate of the retarding and analyzing column C, so as to choke the apparatus by too-rapid condensations of the vapors, this plate is provided with a large number of tubes 6 of a certain height, around which the entering phlegms circulate and through which the vapors from below pass in such manner that they heat the phlegms without mixing therewith. It is easy to see that in their downward flow the crude phlegms give off more and more of their most volatile constituents and to understand that by suitably proportioning the supply of liquid to the size of the apparatus C the phlegms which arrive in the boiler A may be sufficiently free from these products for the ebullition in the boiler A to remove them completely.

The purified phlegms escape boiling hot from the boiler A by an escape-pipe $d$, which conducts them into the regenerator R, where they are deprived of heat to the advantage of the crude phlegms which circulate in the coil of this apparatus. The cooling is completed by a passage through a tubular or serpentine refrigerator D, in which the phlegms are brought to a temperature of 15° to 20° centigrade. They thence pass by way of proof-bottle E to special reservoir.

It may be here stated that the vertical arrangement which is shown for the retarding analyzer as being the most convenient and least costly can be replaced by any other producing the like effect, which is (and this is insisted on as an important feature) to prolong the stay of the phlegms in the continuous apparatus, at the same time analyzing or converting them into products constantly purer and purer.

Among other dispositions which can be adopted may be mentioned, for example, a series of boilers in cascade communicating by siphons, by overflows from one boiler dipping to the bottom of the next, or by other suitable connections.

Use could also be made of a single boiler divided into compartments communicating with each other in such manner as to permit the passage of the alcohol through them in succession.

In all cases the crude alcohols or impure phlegms should enter from one side the series whose object is to retard and analyze them and the purified phlegms or alcohols should pass off from the other side.

The vapors produced in the boiler and the retarding-analyzer are conducted by the pipe X into the analyzing-condenser B.

This apparatus should realize two conditions:

First. The condensation-surfaces should be disposed in such manner that no small current of vapor can pass without being brought into contact with such surfaces. They should make a veritable analysis of the mixed vapors presented to them by permitting the escape of some and effecting the condensation of the others. This condition is secured by forcing the vapors to pass in thin layers through very narrow annular spaces formed by two concentrically-placed metallic tubes, the exterior of the inside tube and the interior of the outside tube constituting two surfaces of condensation which can be brought so close together that by giving a sufficient length to the tubes perfect assurance may be had that all the molecules of vapor in passing through the very narrow annular spaces between said surfaces of condensation will be brought into contact with one or the other of them.

Second. The maintenance of the surfaces of condensation at the required temperature, which naturally will be dependent upon the nature of the vapors which constitute the mixture to be analyzed or separated.

In the example chosen the object sought is the separation of the ethylic alcohol from the vapors of aldehydes or other very volatile products. If consideration be given to the boiling-points of these products and that of ethylic alcohol, it will be seen that by maintenance of the condensation-surfaces in the neighborhood of 65° centigrade and below 75° centigrade all the alcoholic vapors which presented themselves will be condensed, while the vapors of liquids such as ethylic aldehyde, acetone, and the like, which have boiling-points sensibly lower than 70° centigrade, will pass off.

In the drawings the vapors to be separated enter the chamber M from the retarding-analyzer C through the pipe X and pass through the very narrow spaces $f$ between the concentric tubes $v\ p$, which are cooled by a suitable fluid (water, for example) flowing over the tubes $v$ and through the tubes $p$. In the passage through the annular spaces $f$ the heavier or alcoholic vapors are condensed and flow down into the chamber M, to escape by the tubulure V, while the lighter vapors, or vapors of aldehydes and similar products, pass into the chamber G and off by the tubulures at the sides thereof. The water at, say, 65° centigrade is supplied to the chamber N, which distributes it to the interior of the tubes $p$, through which it passes into the chamber O, and thence out by the tubulure Q at the bottom thereof, and it is also supplied through the tubulures U to the chamber P, which surrounds the tubes $v$, and from which it escapes by the tubulures S (one of them represented in dotted lines, Fig. III) at the bottom.

The plates $a$ and $b$, which receive the tubes $p$, are provided with holes large enough for the passage of the tubes $v$, and bushings of soft bronze are used around the tubes $p$, being forced in tightly to prevent all leakage. This arrangement has for its object to facilitate the replacement of the large tubes $v$ should occasion demand it.

In case it is desired to replace the tubular analyzing-condenser B by a coil, this should be made of pipe so flattened as to reduce the thickness of the stream of vapors to be condensed or liquids to be cooled, and thus prevent any of their molecules escaping contact with and consequently escaping the action of the condensing or cooling surfaces.

The condensed liquid is returned to the retarding-analyzer C by the pipe 7 or is collected apart. The vapors which escape condensation in the analyzing-condenser B pass by way of the pipe $k$ into and then through a refrigerator K, wherein they are wholly or for the most part condensed, the condensed liquid flowing by way of the proof-bottle E' to a special reservoir, or being retaken and treated separately for the extraction from it of alcohol on one side and the aldehyde and other volatile products on the other by the aid of one or another of the known means for effecting their separation.

The operation to which the crude alcohols or phlegms are subjected in the new or improved apparatus is, as a whole, as follows, referring to the drawings by way of illustration: The crude phlegms on entering the regenerator R are preliminarily heated at the expense of the purified phlegms which escape from the boiler A, and from which the crude phlegms extract their heat. Then the hot crude phlegms are subjected in the retarding-analyzer C to a series of ebullitions or successive partial evaporations, which relieve them progressively of all the light products which they contain, and which are vaporized, together with a small quantity of alcohol and water, and almost completely removed in the passage through the retarding-analyzer. The phlegms descend into the boiler A, where their purification is completed, and then pass into the regenerator R, and are therein partially cooled in heating the entering crude phlegms. They are then discharged through a cooler D and pass off by way of the proof-bottle E, deprived of their volatile products and suitably cooled for storage in ordinary reservoirs. The mixture of vapors which we have seen is formed in the retarding-analyzer C passes into the analyzing-condenser B, where, in consequence of the special arrangement and the appropriate temperature of the surfaces of condensation, the alcoholic and watery vapors are condensed. The condensed liquid descends into the retarding-analyzer C or is received apart. The uncondensed light vapors from the analyzing-condenser B pass through a refrigerator K, and the condensed portion thence passes through a hermetically-sealed proof-bottle E' and suitable pipes to special reservoirs, while any vapors still uncondensed can be directed into an apparatus to be absorbed by an appropriate liquid, or can be simply discharged into the atmosphere. Thus the economical, continuous, and rational purification of phlegms and crude alcohols is effected.

It is evident that the same apparatus can be applied to the separation of all mixtures of vapors from liquids boiling at different temperatures under the same conditions of economy and continuity. Some details of construction and the temperature of the surfaces of condensation have only to be changed.

An important point in running the apparatus is the maintenance of the condensation-surfaces in the analyzing-condenser at the temperature which experience has shown to be the most suitable for the mixture of liquids to be separated.

By the present invention the conditions of simplicity, safety, and economy sought for in an industrial apparatus are, it is believed, secured most effectively.

It is stated above that in the case of purifying phlegms the temperature which has been found most suitable is about 65° centigrade for the upper part of the apparatus B, this temperature not being allowed to pass beyond 75° centigrade about at the lower part, so as to utilize completely the surface of the analyzing-condenser. It hence results that the water entering above at a temperature of about 65° and escaping below at about 75° centigrade can be reused if cooled through about 10°. This lowering of temperature can be obtained by the passage of the hot water through a tubular or serpentine cooler, the water for cooling being employed after its discharge for feeding a steam-generator, for example. The simplest and cheapest means is the addition to the hot water from the analyzing-condenser of a sufficient quantity of cold water, this mixture being secured by passage through a vessel with baffle-plates or like apparatus. Such a cooling-vessel is shown at W, the tortuous course of the liquid induced by the baffle-plates (shown in dotted lines) being indicated by the arrows. The pipes Y Y' deliver the hot water from the chambers P and O of the analyzing-condenser B into the vessel W and the pipe $y$ the cold water in regulated quantities, and the pipe Z delivers the cooled water to the chambers N and P at the top of the analyzing-condenser B. The circulation of the water is secured by a suitable pump, (not shown,) which is or may be placed in the pipe Z. An overflow serves to discharge from the circulation a quantity of water equal to that introduced by the pipe y. The pipes pass within reach of the operator in charge, who, by the use of a thermometer and the regulation of the quantity of cold water introduced, can maintain constant the temperature of the water which enters the analyzing-condenser. The arrangement adopted for the latter apparatus insures the absolute equality of temperature in all parts of the condensation-surfaces situated in the same horizontal plane.

My invention includes the apparatus for separating liquids of different boiling-points generally, as well as in the special form shown, with or without the means for cooling the water for the analyzing-condenser by the introduction of a regulated supply of cold water.

The boiler A is heated by the steam-coil 11, the admission of steam being regulated automatically by the regulator 8, of well-known construction. It is connected with the boiler A by the pipe 9, and is operated by the pressure in the boiler to control the passage of steam through the pipe 10.

I therefore claim as my invention or discovery—

The described apparatus, comprising the following elements in combination, namely: first, the regenerator composed of chambers, such as a hollow coil and an inclosing-chamber on opposite sides of heat-conducting walls and provided with individual inlets and outlets; second, the boiler composed of a receiving-chamber and a heater therefor, such as a coil, arranged therein; third, the retarding-analyzer composed of a series of communicating chambers, and, fourth, the analyzing-condenser composed of a vessel provided on the inside with a number of narrow parallel flat passages, such as formed between concentric tubes of nearly the same diameter, and with an inlet and an outlet for the said passages separate from those for the space in said vessel on opposite sides of said passages, the interiors of said four elements communicating with one another, as follows, namely: the outlet for one chamber of the regenerator with the first chamber of the retarding-analyzer, the inlet for the other chamber of the regenerator with the boiler, the last chamber of the retarding-analyzer with said boiler, the inlet to the flat passages in the analyzing-condenser with the said first chamber of the retarding-analyzer, and the inlet and outlet of the space in said condenser on opposite sides of said passages with circulating-pipes, substantially as and for the purpose set forth.

In testimony whereof I have signed this specification in the presence of two subscribing witnesses.

LOUIS EDME ACHILLE PRANGEY.

Witnesses:
 ROBT. M. HOOPER,
 EUGÈNE DUBOIS.